US008016353B2

(12) United States Patent
Kuno

(10) Patent No.: US 8,016,353 B2
(45) Date of Patent: Sep. 13, 2011

(54) VEHICLE SEAT HAVING MONITOR

(75) Inventor: Satoru Kuno, Aichi-ken (JP)

(73) Assignee: Toyota Boshoku Kabushiki Kaisha, Aichi-ken (JP)

(*) Notice: Subject to any disclaimer, the term of this patent is extended or adjusted under 35 U.S.C. 154(b) by 206 days.

(21) Appl. No.: 12/328,064

(22) Filed: Dec. 4, 2008

(65) Prior Publication Data

US 2009/0174238 A1 Jul. 9, 2009

(30) Foreign Application Priority Data

Jan. 8, 2008 (JP) ................... 2008-001183

(51) Int. Cl.
*A47C 7/72* (2006.01)
(52) U.S. Cl. ........... 297/217.3; 297/188.04; 297/188.05; 348/837
(58) Field of Classification Search ............... 297/217.3, 297/188.04, 188.05; 348/836, 837, E5.128
See application file for complete search history.

(56) References Cited

U.S. PATENT DOCUMENTS 5,010,668 A * 4/1991 Zeligson ................... 40/324
7,251,552 B2 7/2007 Schmeisser et al.
2002/0054440 A1 5/2002 Akamine et al.
2004/0239155 A1 12/2004 Fourrey et al.
2007/0290536 A1 12/2007 Nathan et al.
2009/0085383 A1* 4/2009 Hicks et al. ............ 297/217.3 X

FOREIGN PATENT DOCUMENTS

| JP | 9-142186 A | 6/1997 |
| JP | 10-43001 | 2/1998 |
| JP | 2004-352239 A | 12/2004 |
| JP | 2004357757 A * | 12/2004 |

OTHER PUBLICATIONS

English language Abstract of JP 2004-352239 A.
English language Abstract of JP 9-142186 A.
U.S. Appl. No. 11/909,834 to Kuno, filed Sep. 27, 2007.
China Office action, dated Feb. 11, 2011 along with an english translation thereof.

* cited by examiner

*Primary Examiner* — Anthony D Barfield
(74) *Attorney, Agent, or Firm* — Greenblum & Bernstein, P.L.C.

(57) ABSTRACT

The present invention includes vehicle seat having monitor movable from a storage state to a use state, in the storage state the monitor is positioned in a backboard of a seatback and the monitor faces the backboard, in the use state a display surface of the monitor is exposed outside of the backboard facing a rear of the vehicle, wherein the backboard is semitransparent.

8 Claims, 5 Drawing Sheets

VEHICLE SEAT HAVING MONITOR

This application claims priority to Japanese patent application serial number 2008-1183, the contents of which are incorporated herein by reference.

BACKGROUND OF THE INVENTION

1. Field of the Invention

The present invention relates to a vehicle seat assembled with a monitor that can be stored in a backboard.

2. Description of the Related Art

A vehicle has been proposed having a monitor by which pictures of DVD, TV programs or the like can be appreciated. To allow such pictures to be directly appreciated even from a rear seat, a vehicle seat has been proposed, which has a monitor on a back of a seat at the front of the vehicle such as a driver seat or passenger seat. In this case, an exposed condition of the monitor, in which the monitor is continuously projected from a seat, is not preferable in the light aesthetics, an outlook of the front from a rear seat, and safety. Thus, JP-A-2004-352239 shows a seat, in which a monitor is stored in a recess formed on a back of a seatback in a freely rising and setting manner. In that seat, when the monitor is not used, it is covered by an opaque cap, and the monitor is folded into the back of the seatback and stored therein. When the monitor is used, the cap is opened so that the monitor is projected in a rising manner. JP-A-9-142186 shows a technique for displaying an operation picture on a monitor operating each sitting positions in a seat.

In the vehicle seat of JP-A-2004-352239, pictures on the monitor cannot be seen unless the opaque cap is opened. In particular, even if not only pictures, but also time, temperature indication, a sitting position in a seat and the like are desired to be continuously displayed on the monitor, such information cannot be confirmed unless the cap is put to a horizontal position.

Thus, there is a need in the art for a vehicle seat in which displayed information on a monitor can be viewed not only in a condition where the monitor is exposed to the outside of a seatback, but also in a condition where the monitor is stored in the seatback.

BRIEF SUMMARY OF THE INVENTION

A vehicle seat of the invention has a monitor that can rise and set between a storage state where the monitor is stored in a backboard of a seatback, and a use state where a display surface is directly exposed to the outside of the backboard. The monitor is disposed toward a rear of the vehicle. In the storage state, a display surface of the monitor faces the backboard. The backboard is semitransparent. The term "semitransparent" refers to an intermediate state between "transparent" and "opaque", meaning a condition where an opposite side is hard to be clearly seen via the board, but can be viewed. The term "transparent" refers to a condition where an opposite side is seen through via the board. The term "opaque" refers to a condition where an opposite side is completely not seen via the board.

As the use state where the display surface of the monitor is directly exposed to the outside of the backboard, a state is given, in which the monitor is pulled out and projected to the outside of the backboard. Alternatively, an appearance state is given, in which while the backboard can be partially opened and closed like a cover, the monitor itself does not move, and such a cover portion of the backboard is opened, thereby a display surface of the monitor is exposed to the outside.

Semi-transparency of a backboard can be achieved by forming the backboard using a semitransparent material including a transparent material added with a slight amount of shading material. Alternatively, the semi-transparency can be achieved by forming a semitransparent film (layer) on an outer or inner surface of a transparent backboard. Alternatively, the semi-transparency can be achieved by forming an opaque film (layer) having a large number of micropores on an outer or inner surface of a transparent backboard.

If the backboard is semitransparent, images on a monitor can be seen via a backboard even in the storage state. Therefore, character information or image information such as time, temperature indication, an audio information picture, and an operation picture of a position in a vehicle seat, the information being not necessarily clearly viewed, can be viewed without particular need of rising and setting operation of the monitor. Particularly, character information being desired to be continuously displayed can be viewed at any time, the character information including time, temperature of a vehicle interior or atmosphere, and a logo when the monitor is not used, which is highly advantageous. Moreover, since the backboard is semitransparent, the inside of the backboard is dark when the monitor is not used. Thus, when a monitor is not used, the monitor is not conspicuous from the outside of the backboard. Even in the case of a picture of a movie, TV or the like, if the picture is strongly stimulative to eyes, such as a picture in which dazzling beams violently cross one another, the picture is appreciated via the semitransparent backboard and thus such stimulation to eyes is reduced, and consequently fatigue of eyes can be reduced. In this way, pictures can be appreciated even in the monitor storage state. On the other hand, when a picture is desired to be appreciated more clearly, the picture can be seen in the use state where the monitor is exposed to the outside of the backboard. That is, how to appreciate a picture can be freely selected.

In the backboard, at least an outer circumferential edge portion is preferably made opaque, the edge portion enclosing the periphery of a display surface of a monitor in the storage state. If the edge portion is opaque, an area of the backboard, which is opposed to the display surface of the monitor, may be partially opaque in some case. As means for making the backboard to be partially opaque, integral molding of a semitransparent portion and an opaque portion may be given. Alternatively, an opaque film (layer) may be formed by performing shading treatment to an inner or outer surface of a semitransparent backboard. When an opaque layer is formed on a backboard on which a semitransparent layer is formed, while the opaque layer may be formed on a surface (outer surface) of the semitransparent layer, the opaque layer is preferably formed on a backboard surface at a side opposite to the semitransparent layer.

When at least the outer circumferential edge portion is opaque in the backboard, while image information displayed on the monitor is visible, an internal structure other than the monitor is avoided to be unnecessarily seen, which prevents degradation in design quality. Moreover, since light from the monitor is collected in the semitransparent portion, even if the monitor is used in the storage state, image information on the monitor is easily viewed without unnecessary dispersion of light.

An outer circumferential edge portion of the backboard is preferably subjected to gradation processing through shading treatment, by which the edge portion becomes gradually semitransparent from an outer circumferential edge of the backboard to the center thereof. Thus, a boundary between a semitransparent portion (image display region) and an opaque portion (shading region) is made to be inconspicuous, leading to improvement in design quality. If shading treatment is performed to an inner surface of the backboard, since a user cannot directly view marks of the shading treatment or the gradation, the user does not feel that the backboard is processed, leading to further improvement in design quality.

An opening, through which the monitor can be put in and out, is preferably formed in the backboard to allow the monitor to slidably rise from and set into the backboard via the opening. Thus, when a monitor is used, an opened cover does not disturb the monitor, which reduces possibility of damage of the backboard, and improves safety of a passenger. A direction in which the monitor is slidably projected is not particularly limited, and may be not only a direction to the upside of the backboard, but also a direction to either side of the backboard or a lower side thereof.

DETAILED DESCRIPTION OF THE INVENTION

Embodiment 1

Figure 1:
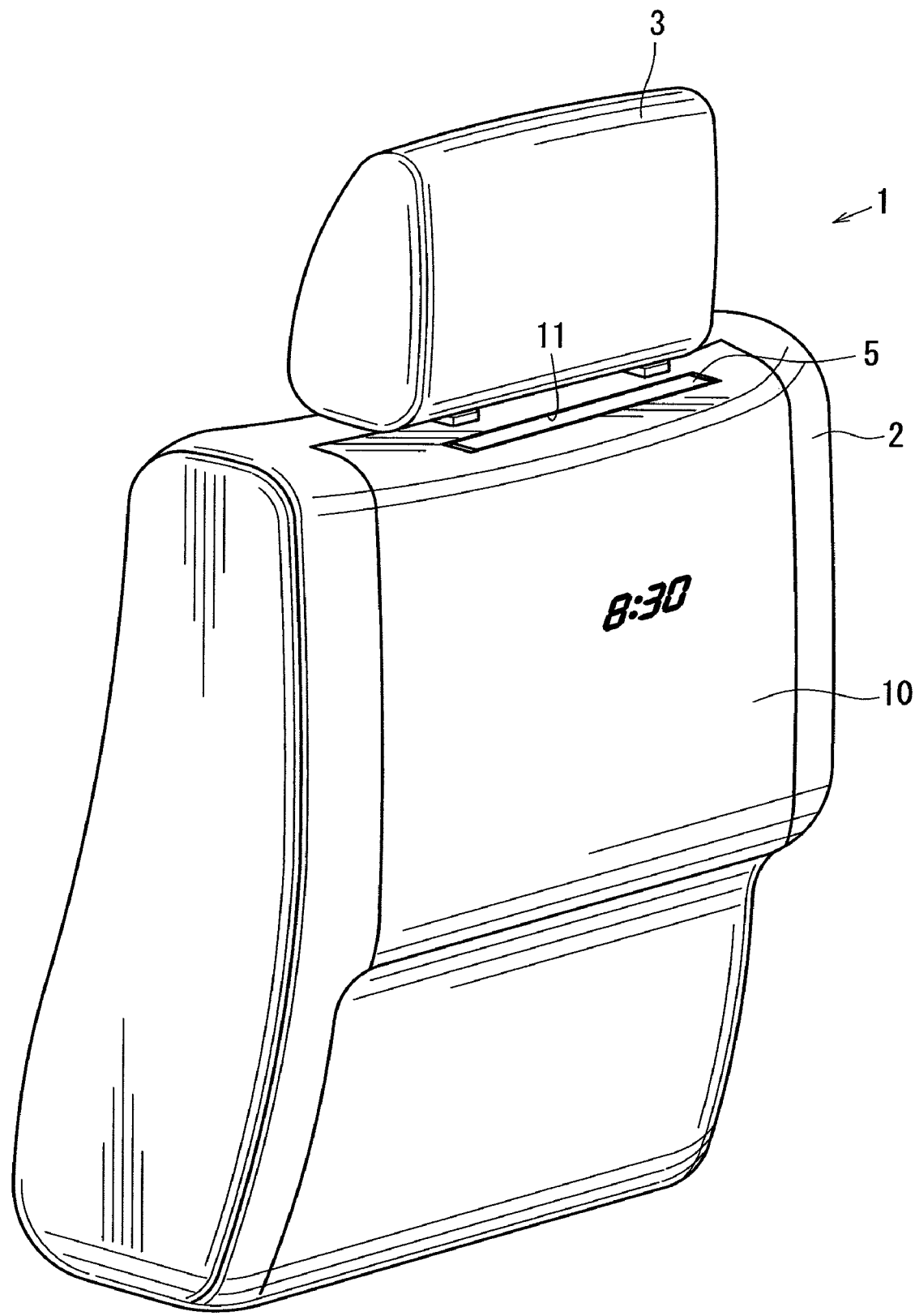
FIG. 1 shows a rear perspective view of a vehicle seat when a monitor is in a storage state.
Figure 2:
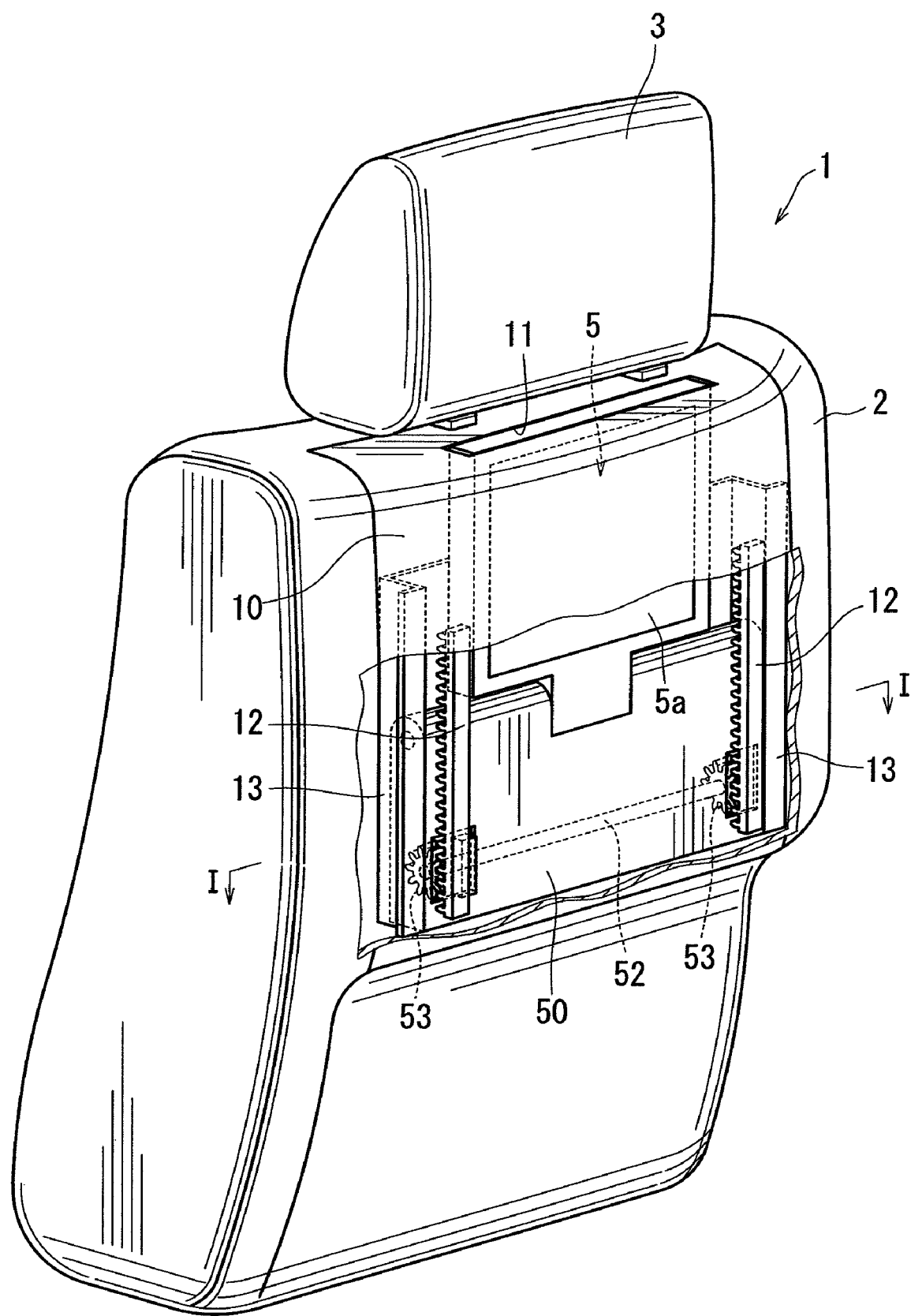
FIG. 2 shows a partially broken, rear perspective view of a vehicle seat when a monitor is in a storage state.
Figure 3:
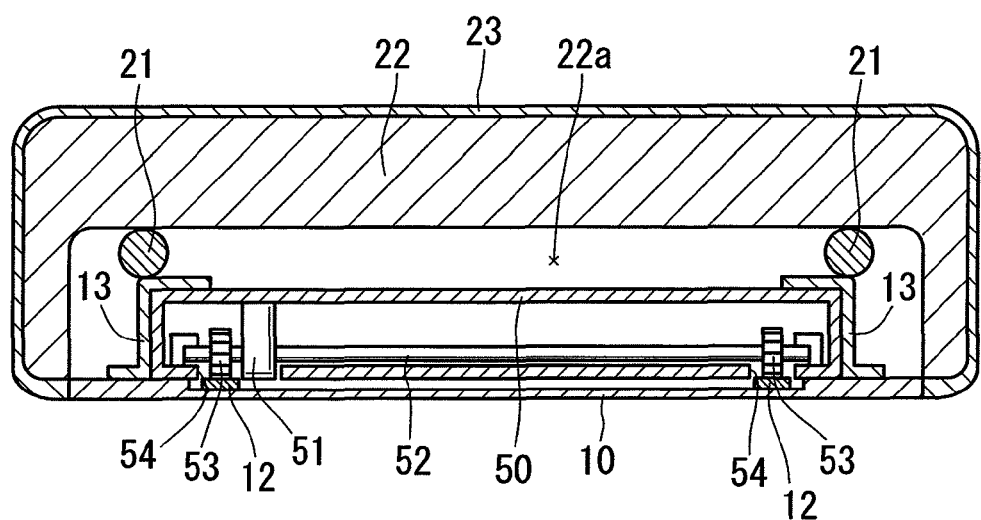
FIG. 3 shows a section view along a line I-I of FIG. 2.
Figure 5:
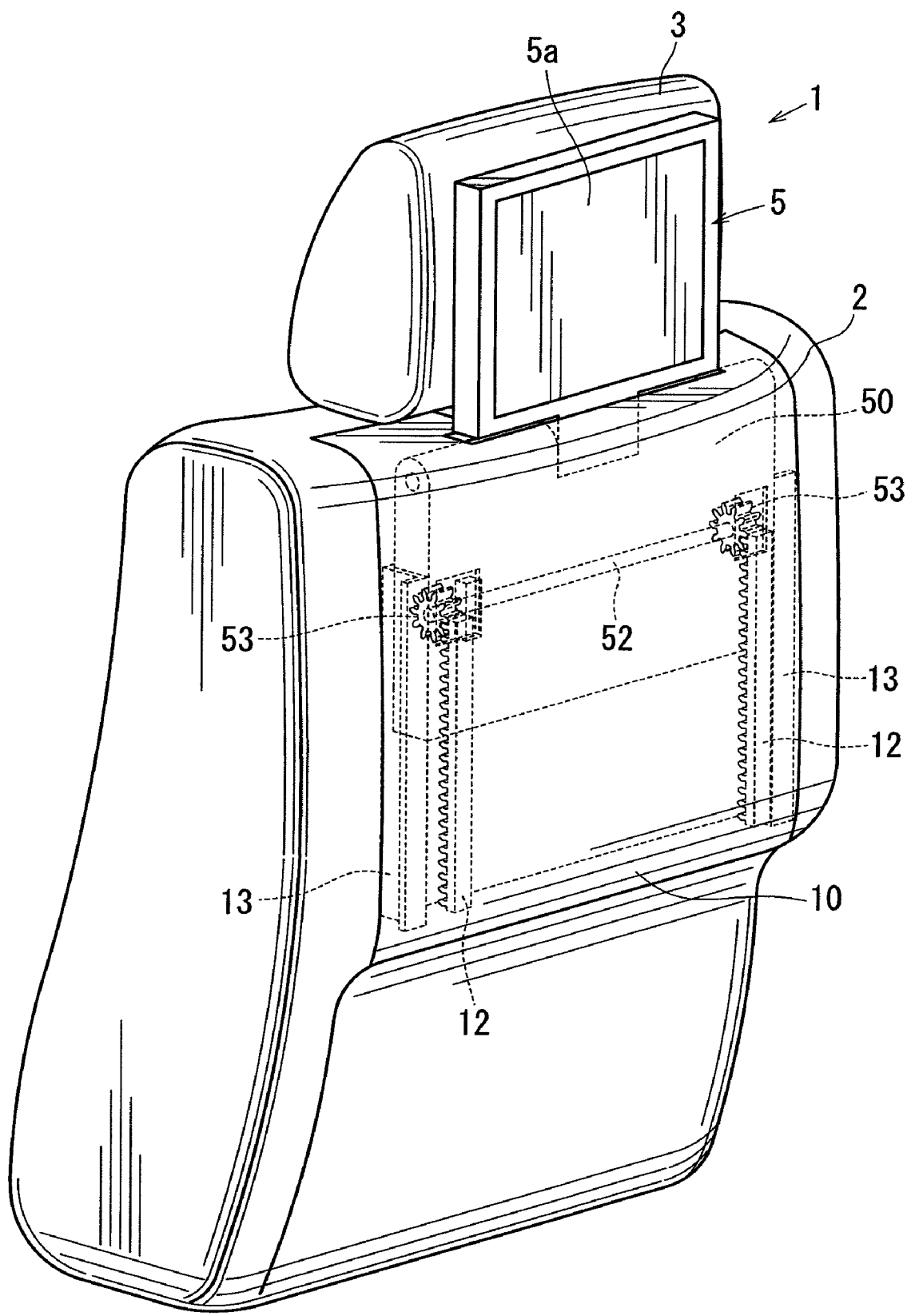
FIG. 5 shows a rear perspective view of a vehicle seat when a monitor is in a use state.

As shown in FIG. 1, a vehicle seat 1 has a seat cushion (not shown) to be a sitting portion, a seatback 2 to be a backrest, and a headrest 3 for supporting a head. The seatback 2 can tilt with respect to the seat cushion. The headrest 3 is assembled on top of the seatback 2. As shown in FIGS. 2 and 3, the seatback 2 has a pair of side frames 21 on either side, a backrest cushion 22 mounted enclosing both the side frames 21, a seat cover 23 for covering the backrest cushion 22, and a backboard 10 for covering a recess 22a formed at a back side of the backrest cushion 22. A monitor 5 is provided in a vertically movable manner in the recess 22a covered with the backboard 10. Various kinds of pictures or character information can be displayed on a display surface 5a of the monitor 5. The monitor 5 can rise from and be set in a storage state as shown in FIG. 1, in which the monitor is stored in the backboard 10 of the seatback 2, and a use state as shown in FIG. 5, in which the display surface 5a projects upward from the backboard 10. As shown in FIGS. 2 and 3, in the storage state, the monitor 5 is disposed toward the rear of a vehicle such that the display surface 5a faces the backboard 10. On the other hand, in the use state, the display surface 5a of the monitor 5 is directly exposed to the outside of the backboard 10. In the use state, the monitor 5 is situated behind the headrest 3.

The vehicle seat 1 is provided at such a position so that a different seat may be provided so that the display surface 5a of the monitor 5 can be seen from the rear side of the vehicle. Typically, the seat 1 can be provided as a front seat to be a driver seat or a passenger seat. In the case of a vehicle having seats in longitudinally three rows, the seat 1 can be provided even as a seat in the second row.

On a top of the backboard 10, an opening 11 being oblong in a vehicle width direction is formed. The monitor 5 can rise from and set into the backboard 10 via the opening 11. As shown in FIG. 2, the monitor 5 is assembled to a frame 50 being vertically movable in an electromotive way by a rack and pinion mechanism. The frame 50 is configured by a case-like box member. A gear box 51 having a not-shown motor is assembled within the frame 50. The gear box 51 is assembled with a shaft 52 connected to the motor. A pair of pinions 53 on either side are assembled to both ends of the shaft 52 respectively. In a surface facing the backboard 10 of the frame 50, a pair of cut holes 54 on either side are formed to project part of the periphery of either pinion 53 to an inner face of the backboard 10.

On the inner face of the backboard 10, a pair of racks 12 on either side are vertically formed integrally with the backboard. Either rack 12 engages with either pinion 53 projected from either cut hole 54. In addition, a pair of guide pieces 13 on either side are vertically formed on the inner face of the backboard 10 integrally with the backboard respectively. Either guide piece 13 comes into the front from either side of the frame 50 so as to pinch the frame 50. Thus, engagement between each pinion 53 and each rack 12 is prevented from being released.

Figure 4:
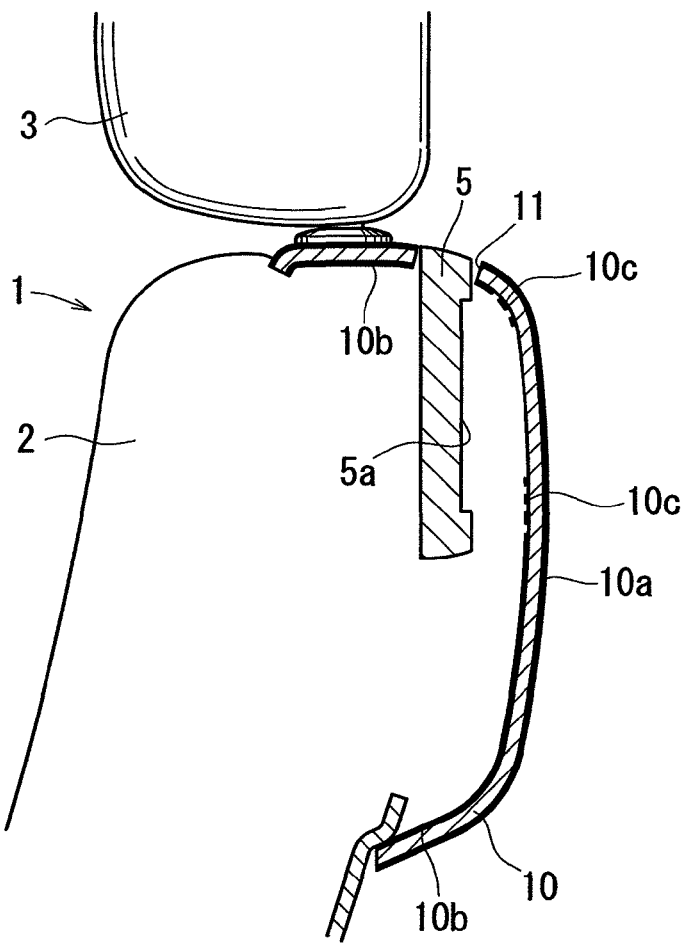
FIG. 4 shows a schematic section view of a seatback according to embodiment 1.

When the motor in the gear box 51 is driven to rotate normally or reversely, such drive force is transmitted to either pinion 53 via the shaft 52. Thus, the frame 50 vertically reciprocates while sliding along the rack 12 via the pinion 53. Since the frame 50 is supported by the guide pieces 13, it does not fluctuate in either of lateral and longitudinal directions. Along with the vertical movement of the frame 50, the monitor 5 assembled on the frame 50 slidably rises and sets in a reciprocating manner between the storage state as shown in FIG. 1 and the use state as shown in FIG. 5. As shown in FIGS. 1 and 4, in the storage state, a top of the monitor 5 and a top of the backboard 10 are in approximately the same level or be coplanar. Thus, improvement in design quality is achieved, in addition, dust or the like is prevented from coming into the backboard 10 from the opening 11. A switch for operating rising and setting of the monitor 5 in an electromotive way is disposed in the vehicle, for example, on an instrument panel or on a side face of a vehicle seat. Upper and lower limits of the reciprocation of the frame 50 are limited by electrical means (for example, a limit switch) or mechanical means (for example, a stopper) respectively.

The backboard 10 includes a semitransparent panel member having certain stiffness. The backboard 10 is formed in a saucer shape having a sufficient area to entirely cover the raising and lowering mechanism of the monitor 5, and having a depth larger than a thickness of the monitor 5. The backboard 10 is formed of transparent resin such as acrylic resin or polycarbonate. As shown in FIG. 4, a semitransparent layer (film) 10a is formed on the whole outer surface of the backboard 10 by semitransparent treatment, so that the backboard 10 as a whole is semitransparent. The semitransparent layer 10a can be formed by coating, spraying, printing, or evaporating a semitransparent paint, or by laminating or adhering a semitransparent film. On the other hand, an opaque layer 10b is formed by opaqueness treatment (shading treatment) in a predetermined region of the inner surface of the backboard 10. In the region where the opaque layer 10b is formed, the backboard 10 is opaque. The opaque layer 10b is formed by coating, spraying, printing, or evaporating an opaque paint (shading paint).

The opaque layer 10b is formed in an outer circumferential edge portion enclosing the periphery of the display surface 5a of the monitor 5 in a front view of the backboard 10. Thus, in the storage state of the monitor 5, an internal structure of the seatback 2 other than the monitor 5, such as the raising and lowering mechanism, is not seen from the outside through the backboard 10 (refer to FIG. 1). In other words, a central portion enclosed by the opaque layer 10b corresponds to a display region of the backboard 10 through which display information and the like on the monitor 5 can be viewed. An inner circumferential edge portion of the opaque layer 10b is subjected to gradation processing by which the edge portion becomes gradually semitransparent from an outer circumferential edge of the backboard 10 to the center thereof. The gradation 10c is formed by forming a large number of micropores of which the diameter becomes larger with approaching an inner circumferential edge of the opaque layer 10b. The gradation 10c is formed in an area in which the opaque layer slightly overlaps with an outer circumferential edge portion of the display surface Sa of the monitor 5 in the storage state. This makes a boundary between the semitransparent portion 10a and the opaque portion 10b to be inconspicuous or hidden from outside view (refer to FIG. 1). When the monitor 5 is not used, since light is shaded by the opaque layer 10b, the inside of the backboard 10 is dark. In addition, since the display surface Sa of the monitor 5 is also essentially dark when the monitor is not used, the monitor 5 is hardly viewed even in the semitransparent portion enclosed by the opaque portion 10b.

On the monitor 5, pictures of DVD, TV programs or the like are displayed, in addition, character information such as time, temperature, and audio information, and an operation picture of a position in the seat 1 and the like are displayed. In particular, character information such as time, temperature indication, and a logo can be continuously displayed even if the monitor 5 is not used. In this case, as shown in FIG. 1, light of the character information passes through the semitransparent portion of the backboard 10, so that only the character information (such as time being continuously displayed) can be viewed as if the character information comes up to the backboard 10. At that time, the monitor 5 is not conspicuous from the outside. When the monitor 5 is used, the use state can be appropriately selected depending on contents of displayed information or preference of a user, for example, various pictures may be seen through the backboard 10 while the monitor is in the storage state, or various pictures may be seen in the use state where the monitor 5 is slidably projected upward from the backboard 10.

Embodiment 2

Figure 6:
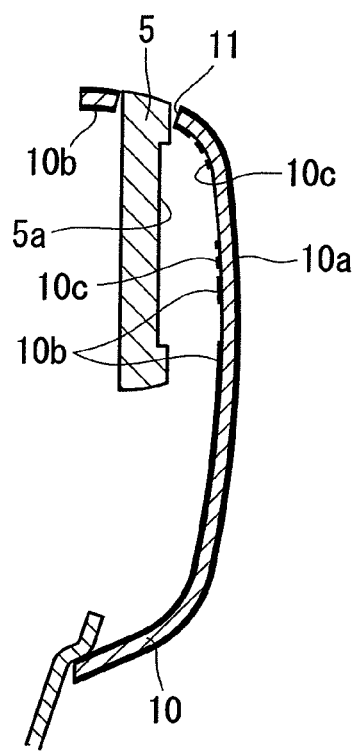
FIG. 6 shows a schematic section view of a seatback according to embodiment 2.

FIG. 6 shows embodiment 2 of the invention. In the embodiment 1, a single display region of the backboard 10 was formed, the display region being enclosed by the opaque layer 10b. However, the display region can be divided into a display region for time, which is continuously displayed even when the monitor 5 is not used, and a display region for a main image such as a picture. The embodiment 2 is characterized in that the opaque layer 10b is formed not only in the outer circumferential edge portion of the backboard 10 enclosing the periphery of the monitor 5, but also in positions enclosing a region, in which character information such as time is continuously displayed, in a region facing the display surface 5a of the monitor 5. Here, the gradation 10c is not formed on the opaque layer 10b enclosing the continuous display region. Thus, a boundary between the semitransparent layer 10a and the opaque layer 10b is sharpened, so that continuous display information seems to be displayed in a display window, and consequently the continuous display information is conspicuous. The gradation 10c is formed on an inner circumferential edge of the opaque layer 10b enclosing the display region of pictures and the like, as in the embodiment 1. Since other configurations are the same as in the embodiment 1, the same members are marked with the same signs, and description of them is omitted.

Other Embodiments

Figure 7:
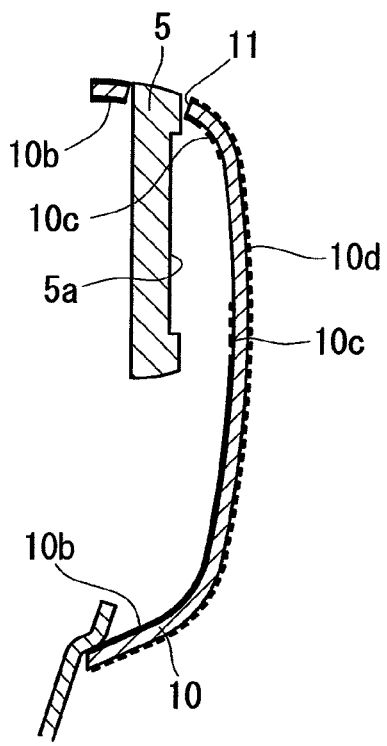
FIG. 7 shows a schematic section view of a seatback showing a modification of an opaque layer.

In the embodiment 1 or 2, the semitransparent layer 10a using a semitransparent material was formed so that the backboard 10 was made to be semitransparent. However, as shown in FIG. 7, the backboard can be subjected to semitransparent treatment by forming an opaque layer 10d having a large number of micropores by screen printing or the like. Moreover, in each of the embodiments, the semitransparent layer 10a was formed on an outer surface of the backboard 10, and the opaque layer 10b was formed on an inner surface of the backboard 10. However, to the contrary, the opaque layer 10b may be formed on the outer surface of the backboard 10, and the semitransparent layer 10a may be formed on the inner surface of the backboard 10. In this case, the semitransparent layer 10a need not be necessarily formed on the outer circumferential edge portion, on which the opaque layer 10b is formed, of the inner surface of the backboard 10.

A direction in which the monitor 5 is slidably projected from the backboard 10 is not limited to an upward direction of the backboard 10 unlike each of the embodiments, and may be movable in either a lateral direction of the backboard, or a downward direction thereof. In this case, the opening 11 for allowing the monitor 5 to rise from and be set in is also preferably formed in either side face of the backboard 10 or in the lower front thereof depending on a projection direction of the monitor 5. The monitor 5 is not limitedly vertically movable, but may be obliquely movable. Moreover, the slide mechanism in each of the embodiments is merely shown as an example, and various other mechanisms may be used to vertically move the monitor.

In each of the embodiments, the monitor 5 was slidably projected from the backboard 10 and used. However, it may be configured so that in a region of the backboard 10, the region facing the display surface 5a of the monitor 5 in the storage state, is made to be openable and closable like a cover, and the relevant cover portion of the backboard 10 is opened so as to expose a monitor 5 provided in an unmovable manner to the outside. In this case, portions other than the cover portion are subjected to opaque treatment, and only the cover portion or the entire backboard 10 including the cover portion can be subjected to semitransparent treatment.

In each of the embodiments, the frame 50 was vertically slidably reciprocated along the inner face of the backboard 10 by a pair of rack and pinion mechanisms on either side. However, the frame 50 may be vertically slid by a single rack and pinion mechanism. In this case, the rack and pinion mechanism is preferably formed in a laterally center portion of the frame 50. Furthermore, the frame 50 can be vertically slid not only by the rack and pinion mechanism, but also by one of various link mechanisms such as a parallel link mechanism or an X link mechanism.

What is claimed is:

1. A vehicle seat, comprising:
a monitor that is movable from a storage state to a use state, wherein:
the monitor is disposed toward a rear,
in the storage state the monitor is positioned in a semitransparent backboard of a seatback and the monitor faces the backboard,
at least an outer circumferential edge portion of the backboard comprises an opaque layer formed by performing shading treatment to a surface of the backboard, the edge portion enclosing a periphery of the display surface of the monitor in the storage state,
the outer circumferential edge portion of the backboard is subjected to gradation processing through the shading treatment, by which the edge portion becomes gradually semitransparent from an outer circumferential edge of the backboard to the center thereof, and
the gradation is formed by forming a large number of micropores of which the diameter becomes larger as the micropores approach an inner circumferential edge of the opaque layer, and
in the use state a display surface of the monitor is exposed outside of the backboard.

2. The vehicle seat according to claim 1:
wherein the backboard is made semitransparent by a semitransparent layer formed on a surface of the backboard, and the semitransparent layer is formed on a surface at a side opposite to the surface, on which the opaque layer is formed, between the surfaces of the backboard.

3. The vehicle seat according to claim 2:
wherein the semitransparent layer is formed using a semitransparent material.

4. The vehicle seat according to claim 2:
wherein the semitransparent layer is formed by an opaque layer having a large number of micropores.

5. The vehicle seat according to claim 1:
wherein the backboard is opaque in positions enclosing a region, in which character information is continuously displayed, in a region facing the display surface of the monitor.

6. The vehicle seat according to claim 5:
wherein the opaque portion enclosing the continuous display region is not subjected to gradation processing.

7. The vehicle seat according to claim 1:
wherein an opening for transferring between the storage state and use state is formed in the backboard, and
the monitor is allowed to slidably rise from and set into the backboard via the opening.

8. The vehicle seat according to claim 1:
wherein character information being continuously displayed on the monitor can be viewed from the backboard in the storage state.

* * * * *